Sept. 20, 1955     W. G. HARVEY     2,718,031

OPERATING MECHANISM FOR MULTI-PART MOLDING DIES

Filed Oct. 25, 1951     2 Sheets-Sheet 1

INVENTOR
WILFRED G. HARVEY
BY
ATTORNEY

Sept. 20, 1955 W. G. HARVEY 2,718,031
OPERATING MECHANISM FOR MULTI-PART MOLDING DIES
Filed Oct. 25, 1951 2 Sheets-Sheet 2

INVENTOR
WILFRED G. HARVEY
BY
ATTORNEY

United States Patent Office 2,718,031
Patented Sept. 20, 1955

2,718,031

OPERATING MECHANISM FOR MULTI-PART MOLDING DIES

Wilfred G. Harvey, Leominster, Mass.

Application October 25, 1951, Serial No. 253,166

2 Claims. (Cl. 18—42)

This invention relates to operating mechanism for the multi-part dies or molds which are frequently employed in injection molding machines, for the molding of plastic articles.

In numerous such machines employing multi-part dies, as typified in the disclosure of Conner Patent No. 2,372,177, dated March 27, 1945, the machine cycle requires, in advance of the parting or separation of the mold-forming die parts, a movement of said parts in unison, to space them a predetermined distance from the usual fixed member through which the plastic is supplied to the mold cavity.

My invention, as hereinafter described, overcomes and eliminates all difficulties heretofore encountered in preventing a premature separation or parting of such die members, during their aforesaid initial movement in unison; in addition, my invention makes provision, at the instant of such parting or separation for the positive locking of one of said die parts in a stationary position, which is maintained until the other die part is returned to its die closing position.

The above and other advantageous features of the invention will hereinafter more fully appear from the following description considered in connection with the accompanying drawings, in which, Fig. 1 is a view in side elevation of an operating mechanism for molding dies embodying the present invention, with the dies in closed position.

Figure 1:
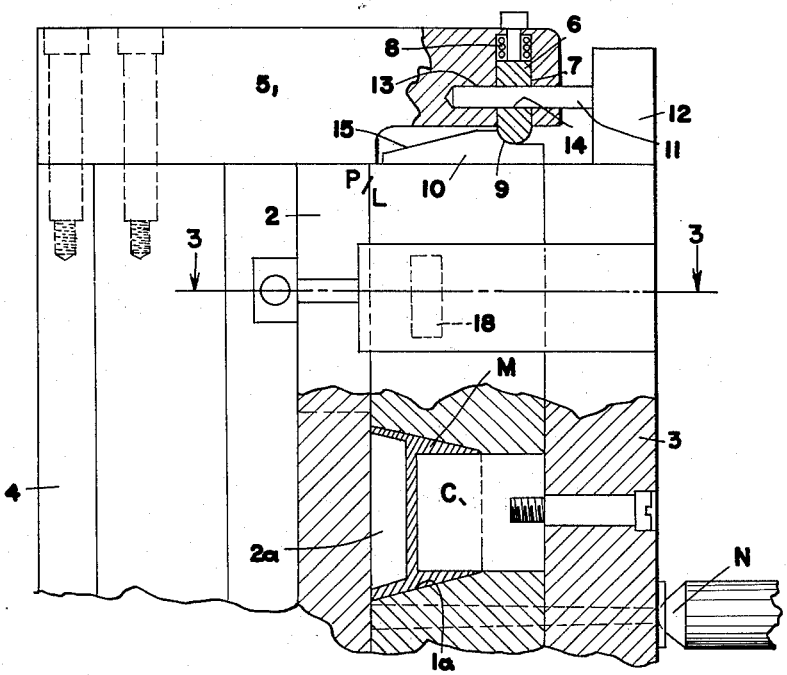

Referring to the drawings, the invention is shown for purposes of illustration in connection with the relatively movable molds or dies 1 and 2 of an injection molding machine of usual construction which provides a suitable nozzle N for injecting plastic material into the dies 1 and 2 to form molded articles within or around molding cavities or projections provided by the dies. As is usual in molding machines, one die is fixed while the other is movable, for which purpose the die 1 is supported by a fixed plate 3, although capable of limited movement thereon, while the die 2 is connected to an operating plate 4 which is adapted to be moved to the left by suitable mechanism, not shown, to separate the dies 1 and 2 along the parting pine PL when the plate 4 is moved from the position of Fig. 1 to the position of Fig. 2.

In the operation of an injection molding machine of the type shown by the aforesaid Conner patent, it is customary to initially shift in unison both of the dies, while they are still closed along the parting line, for the purpose of removing cores from the molded articles, after which the usual parting of the dies is obtained by continuing the movement of one and arresting the movement of the other. The present invention relates to a mechanism for first moving both of the dies 1 and 2 together, with reference to the fixed plate 3, until the die 1 is spaced a predetermined distance therefrom, after which the die 2 continues its movement with the plate 4 to open the dies along the parting line, while the die 1 remains locked in its arrested position.

Figure 2:
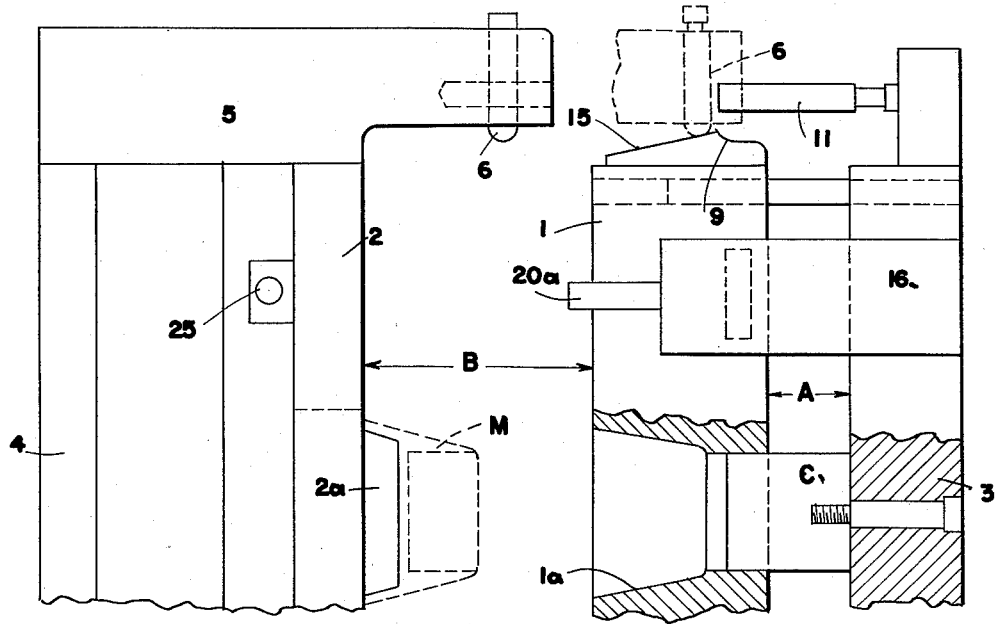
Fig. 2 is a view in side elevation similar to Fig. 1, with the dies in open position.

Referring now to Figs. 1 and 2, the mechanism for first shifting and then arresting movement of the die 1 is shown in the form of attachments mounted on the sides of the plates 3 and 4 respectively. For the purpose of causing the die 1 to move away from the fixed plate 3 while still supported thereby, the movable plate 4 carries a block 5 extending along the edge of the die 1 and spaced therefrom, with the end of the block providing a pull bar 6 extending in the direction of the die 1. The bar 6 is movable in a slot 7 extending through the block 5, with a spring 8 serving to hold the end of the bar 6 in a notch 9 provided in a pull plate 10 mounted on the side of the die 1. When the dies 1 and 2 are closed, as shown in Fig. 1, the bar 6 is positively held with its end disposed in the notch 9 by means of pins 11 projecting from a block 12 mounted on the fixed die plate 3. The pins 11 are received in openings 13 and 14 provided in the block 5 and the pull bar 6 respectively, and therefore serve to positively hold the bar 6 within the notch 9 during the first portion of the die opening movement, as caused by travel of the operating plate 4 between the extreme positions shown in Figs. 1 and 2.

Assuming that articles have been molded within the closed dies 1 and 2, the first step in stripping and ejecting these articles consists in moving the die operating plate 4 to the left, as indicated by the arrow in Fig. 1, to cause an initial separation between the die 1 and the fixed plate 3, while still maintaining the dies 1 and 2 closed along the parting line PL. This initial movement of the die 1 with the die 2, is caused by the engagement of the pull bar 6 with the end of the notch 9 with the pins 11 serving to prevent the bar from moving inwardly. However, as the die 1 reaches a position wherein it is separated from the plate 3 by the distance A, as indicated in Fig. 2, the withdrawal of the pins 11 from the openings 14 in the bar 6 will permit the bar to yield against the pressure of the spring 8, since the end of the bar is then free to ride up the rounded end of the slot 9. This action is indicated in dotted lines in Fig. 2, from which it is apparent that the die 1 is then released from any further movement with the operating plate 4, so that the die 2 will thereafter move away from the die 1, until the dies are fully open as shown in Fig. 2, to permit the ejection of molded articles into the space B between the dies by the usual knockout mechanism, the details of which form no part of the present invention. It is to be noted that after the pull bar 6 clears the notch 9, it is free to again project beyond the block 5 under the pressure of the spring 8, after riding down an inclined surface 15 provided on the pull plate 10 for a purpose which will be hereinafter described.

As previously pointed out, the mechanism of the present invention provides means for positively locking the die 1 following its initial shifting movement away from the fixed plate 3 by the operation of the pull bar 6. For this purpose, the plate 3 carries a block 16 extending along one side of the die 1, with the block 16 providing an opening 17 in which a locking bar 18 is movable at right angles with respect to a second opening 19 in which a plunger 20 is movable. The plunger 20 extends freely through a slot 21 in the bar 18, and a spring 22 between the plunger 20 and the end of opening 19 tends to urge a shoulder 23 on the plunger 20 in engagement with a shoulder 24 on the bar 18 at the outer end of bar slot 21.

Figure 3:
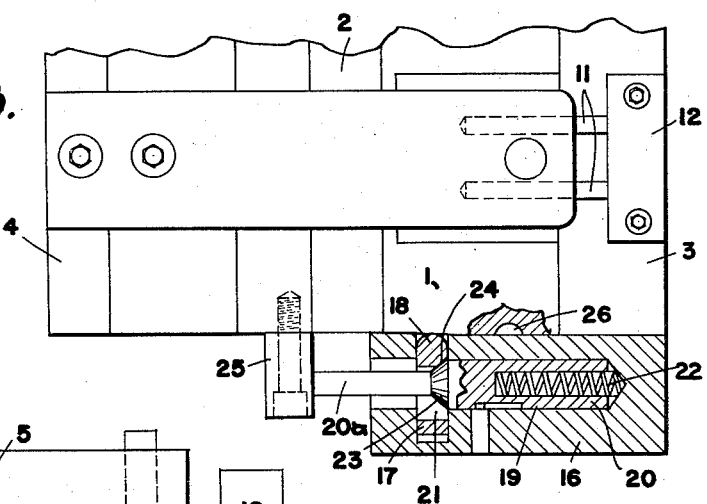
Fig. 3 is a view partially in plan, and partially in horizontal section along the line 3—3 of Fig. 1 showing the construction of the die locking device.

When the dies 1 and 2 are in the closed position of Fig. 3, the end of the bar 18 bears on the side of the die 1 and the spring 22 within the plunger 20 is compressed through the engagement of an extension 20a of the plunger with a fixed stop 25 mounted on the die 2. However, it will be apparent that as soon as the operating plate 4 starts to move to the left, the stop 25 will clear the end of the plunger 20, so that the compressed spring 22 will hold the shoulders 23 and 24 in engagement to exert a pressure tending to urge the bar 18 outwardly.

Figure 4:
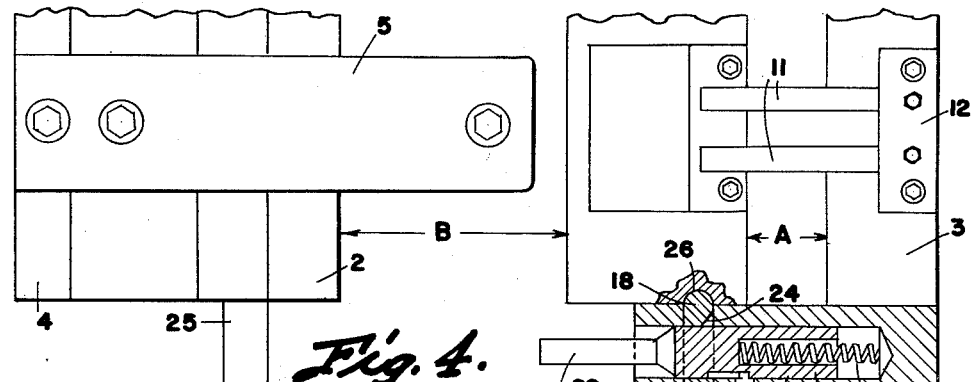
Fig. 4 is a combined plan and sectional view similar to Fig. 3, showing the parts of the die locking device in operative position.

The relation of parts is such that as the die 1 reaches the position of Fig. 2, in which the pull bar 6 is released from the notch 9, the end of the locking bar 18 will be projected into a notch 26 provided on the inner face of the die 1, as shown in Fig. 4. Therefore, the die 1 will be positively maintained in its separated position with respect to the plate 3, while the die 2 continues its movement with the operating plate 4 to open the dies along the parting line PL and finally separate them to the point where the molded articles can be readily ejected into the space B between the fully opened dies as indicated in Fig. 2. Therefore, the die 1 will remain locked while the operating cycle is completed through ejection of the molded articles and the die 1 will remain in its locked position until the dies are again closed by movement of the operating plate 4 to the right from the position of Fig. 2.

As the operating plate 4 moves to the right to close the space B between the dies 1 and 2, the projecting end of the pull bar 6 will ride up the inclined surface 15 of the pull plate 10, thereby retracting the bar against the pressure of the springs 8. However, the die 1 will remain fixed during this camming action on the bar 6, since the locking bar 18 is then seated in the notch 26 on the die 1. As the die 2 continues its closing movement, the pins 11 enter the openings 13, while the die 1 is still locked, after which the stop 25 engages the extension 20a of the plunger 20 to move the plunger inwardly with respect to the bar 18. When this occurs, the pressure exerted on the projecting end of the bar 18 by the notch 26 causes the bar to move inwardly, since the plunger 20 is no longer in the way. Thereafter, the die 1 moves with the die 2 until the space A is closed, by which time the outer end of the pull bar 6 has already passed over the inclined surface 15 and is again seated in the notch 9 with the pins 11 extending therethrough in readiness for to exert a pull on the die 1 at the start of the next die opening operation.

As previously pointed out, the above-described operation of the mechanism for first moving both dies 1 and 2 together with reference to the fixed plate 3, until the die 1 is spaced a predetermined distance therefrom, followed by opening of the dies 1 and 2 along the parting line, is useful for the purpose of removing cores from the molded articles while the dies are still closed. For the purpose of illustrating this particular utility of the present mechanism, Fig. 1 shows a core C mounted on the fixed plate 3 for cooperation with the molding cavity 1a of the die 1 and a molding projection 2a on the die 2. When the dies are closed, plastic material injected by the nozzle N into the space defined between the molding cavity 1a, the molding projection 2a and the core C will produce a molded article M of generally cup-shaped form.

Therefore, when the die 1 is moved from the position of Fig. 1 to the position of Fig. 2, the separation of the die 1 from the fixed plate 3 will cause the core C to be withdrawn from the molding cavity 1a, after which the die 1 is held stationary by the locking bar 18, upon release of the die by the pull bar 6. As a result, continued movement of the operating plate 4 will cause the molded article M to be withdrawn from the molding cavity 1a by reason of the fact that the molded article will adhere to the molding projection 2a. When the die 2 has reached the fully open position, with respect to the then stationary die 1, the space B between the dies will then provide ample room for ejecting the molded article by means of any suitable knockout mechanism such as is usually employed and as shown, for example, in my Patent No. 2,483,094, dated September 27, 1949.

Upon reclosure of the dies 1 and 2, the release of the die 1 by the locking bar 18 will cause the core C to reenter the molding cavity 1a, as the die 1 moves with the die 2 to close the space A. The dies will then be in readiness for another molding operation with the assurance that the parts of the die pulling mechanism will be in proper alignment, due to the fact that the pins 11 will have entered the openings 13 in the block 5 while the die 1 is still held by the locking bar 18.

Figure 5:
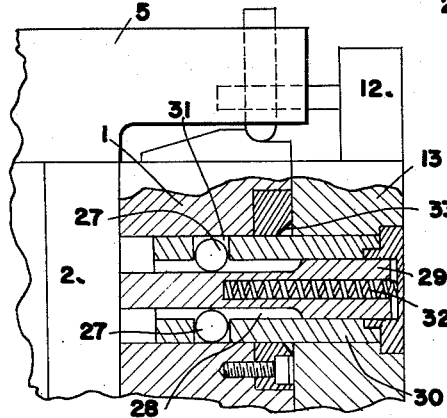
Figs. 5 and 6 are sectional views illustrating a modification of the die locking device, in different positions.
Figure 6:
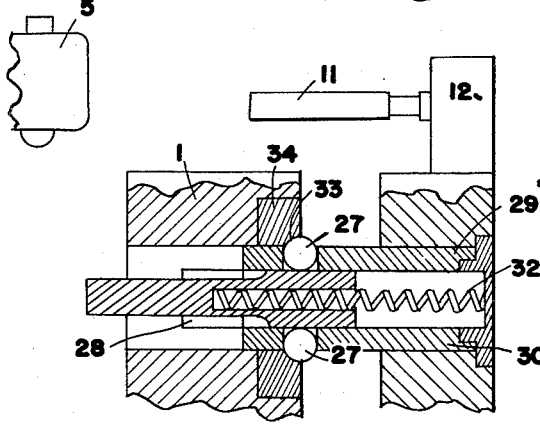

Referring now to Figs. 5 and 6, there is shown a modification of the die locking device in which the locking bar 18 is replaced by balls 27 which are received in a pair of slots 28 provided on a plunger 29 that is movable within a sleeve 30 mounted in the fixed plate 3. It is to be noted that with the dies 1 and 2 closed as shown in Fig. 5, the outer portions of the balls 27 are also received in slots 31 extending through the wall of the sleeve 30.

The parts of the mechanism are maintained in the position of Fig. 5 by engagement of the outer end of the plunger 29 with the die 2. With the plunger 29 in this position, a spring 32 inside the plunger 29 is compressed, so that at the start of the die opening movement the plunger is pressed outwardly by spring 32 until the curved ends of slots 28 exert a pressure on the balls 27 tending to force them outwardly through the slots 31. However, the balls 27 are prevented at that time from outward movement by the die 1, until the die 1 is moved by the pull bar 6 to the position of Fig. 6, in which the balls 27 are free to spring outwardly into a groove 33 provided in a plate 34 mounted in the rear face of the die 1. When this occurs, the slots 28 on the plunger 29 move beyond the balls 27, so that the cylindrical portion of the plunger 29 maintains the balls in locking position within the groove 33, thereby positively locking the die 1 in the position to which it has been moved by the pull bar 6. Here the die 1 remains, until reclosure of the dies again causes the die 2 to engage the end of the plunger 29, and thereby permit the balls to reenter the slots 28 on the inwardly moving plunger, whereupon the die 1 is again free to move with the die 2.

I claim:

1. Mechanism of the class described, comprising a pair of die members cooperating when in juxtaposed relation to provide a mold cavity, a fixed member through which plastic material is supplied to said mold cavity and on which one of said die members is slidably supported, means connected to the other die member for moving same away from said fixed member in the operation of separating said die members on their parting line, a yieldable detent for transmitting such movement of the other die member to the first die member, for the joint movement of same away from said fixed member, prior to such separation, means for arresting movement of the first die member when at a predetermined distance from said fixed member, whereby the continuation of the other die member's movement obtains the separation of said die members on their parting line, and means operative throughout said continuation movement and return movement of said other die member, for locking said first die member in its arrested position, against movement in either direction.

2. Mechanism of the class described, comprising a pair of die members cooperating when in juxtaposed relation to provide a mold cavity, a fixed member through which plastic material is supplied to said mold cavity and on which one of said die members is slidably supported, means connected to the other die member for moving same away from said fixed member in the operation of separating said die members on their parting line, a yieldable detent for transmitting such movement of the other die member to the first die member, for the joint movement of same away from said fixed member, prior to such separation, means for arresting movement of the fist die member when at a predetermined distance from said fixed member, whereby the continuation of the other die member's movement obtains the separation of said die members on their parting line, means responsive to the arrest of said first die member for locking same in its arrested position until the return movement of the other die member is substantially completed, and means operating on said detent until said first die member's movement is arrested, to render said detent unyieldable, thereby to prevent any separation of said die members on their parting line, until they have moved in unison through said predetermined distance.

References Cited in the file of this patent
UNITED STATES PATENTS

| | | |
|---|---|---|
| 2,372,177 | Conner | Mar. 27, 1945 |
| 2,415,961 | Nast | Feb. 18, 1947 |
| 2,483,094 | Harvey | Sept. 27, 1949 |
| 2,520,263 | Vinal | Aug. 29, 1950 |